United States Patent [19]
Carter et al.

[11] Patent Number: 6,100,617
[45] Date of Patent: Aug. 8, 2000

[54] ELECTRICAL INSULATION BARRIER FOR AN ELECTRIC MOTOR

[75] Inventors: Eluid David Carter, Southfield; Stephen A. Nelson, Berkley, both of Mich.

[73] Assignee: Johnson Electric Automotive, Inc., Plymouth, Mich.

[21] Appl. No.: 09/164,684

[22] Filed: Oct. 1, 1998

[51] Int. Cl.[7] .......................... H02K 5/16; H02K 13/00; H01R 39/38
[52] U.S. Cl. ............................ 310/90; 310/238; 310/242
[58] Field of Search .............................. 310/43, 90, 239, 310/242, 238

[56] References Cited

U.S. PATENT DOCUMENTS

| | | | |
|---|---|---|---|
| 3,573,522 | 4/1971 | Pentland | 310/239 |
| 3,654,504 | 4/1972 | Susdorf et al. | 310/239 |
| 3,875,436 | 4/1975 | MacFarland | 310/43 |
| 4,110,651 | 8/1978 | Fagan | 310/239 |
| 4,293,789 | 10/1981 | King | 310/239 |
| 4,355,253 | 10/1982 | Vollbrecht | 310/239 |
| 4,387,315 | 6/1983 | Barthruff et al. | 310/90 |
| 4,475,053 | 10/1984 | Mayer | 310/239 |
| 4,593,221 | 6/1986 | Harris et al. | 310/242 |
| 4,695,755 | 9/1987 | Brown | 310/236 |
| 4,795,932 | 1/1989 | Long | 310/43 |
| 5,343,106 | 8/1994 | Lungu et al. | 310/239 |
| 5,594,290 | 1/1997 | Shannon et al. | 310/251 |
| 5,969,458 | 10/1999 | Yumiyama et al. | 310/239 |

*Primary Examiner*—Clayton LaBalle
*Attorney, Agent, or Firm*—Howard & Howard

[57] ABSTRACT

An electric motor assembly includes an electric barrier member positioned between the electric brushes and the bearing. The electric barrier member preferably is a generally annular disk made from a high-temperature dielectric material. The non-conductive barrier member ensures that no electrical communication occurs between the brushes and the bearing despite a close proximity between those components. A method of making a motor assembly to include a non-conductive barrier member designed according to this invention is also disclosed.

15 Claims, 4 Drawing Sheets

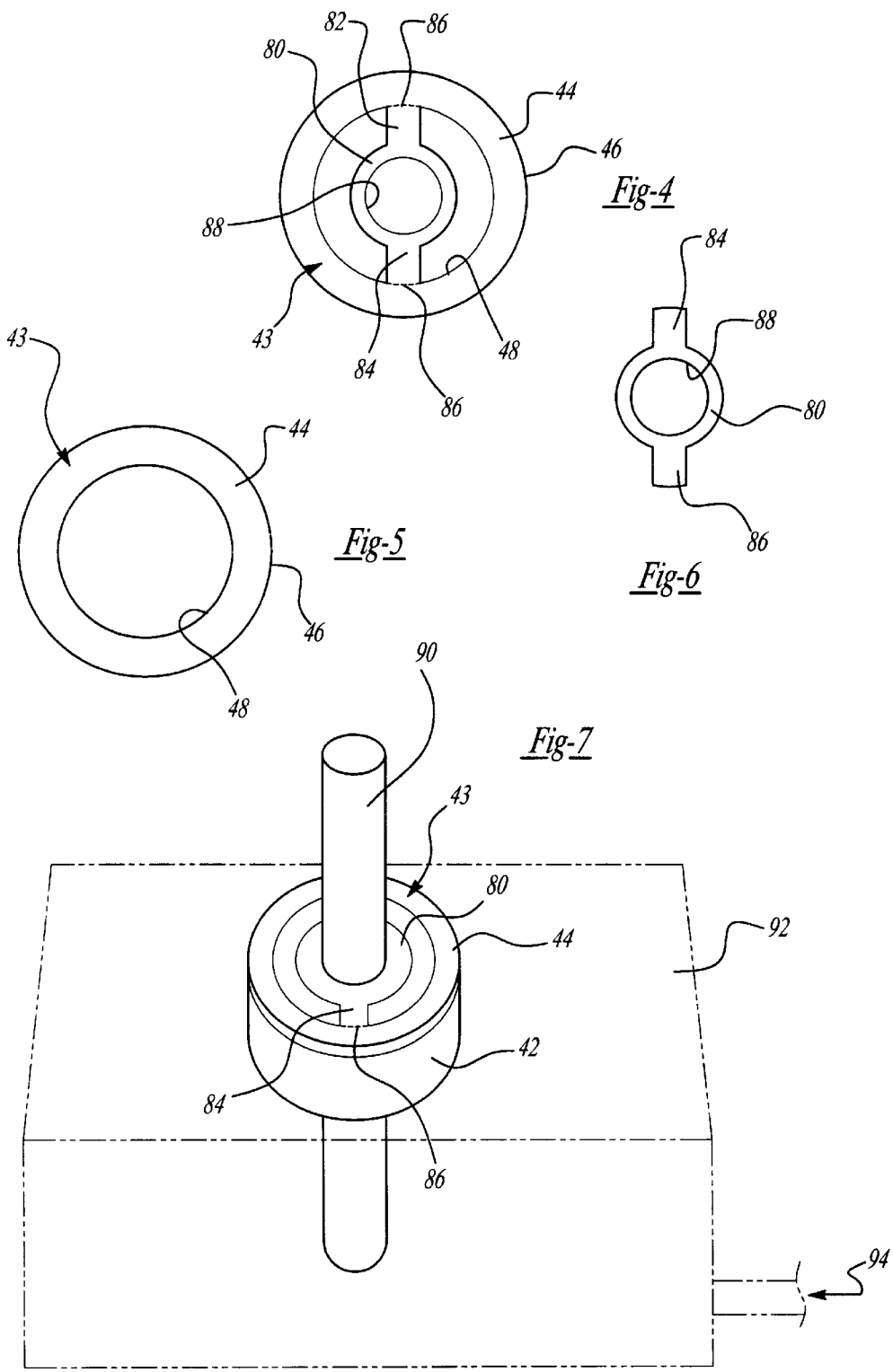

ELECTRICAL INSULATION BARRIER FOR AN ELECTRIC MOTOR

BACKGROUND OF THE INVENTION

This invention generally relates to electric motors. More specifically, this invention relates to an electrical insulation barrier for use within an electric motor.

Electric motors are well known. They typically include a housing, a stator and pole arrangement, a commutator and electrical brushes. Supplying current to the commutator through the electrical brushes induces a desired rotary motion with the electric motor. A rotary shaft rotates responsive to the commutator motion and provides for coupling the electric motor to a device to be driven by the rotary motion of the motor.

Even though electric motors are well know, those skilled in the art are always striving to make improvements. One particular design concern that has been problematic, for example, is being able to make a compact-design motor. In many instances it is desirable to make a compact motor because space limitations exist. The difficulty is that when various components within the motor are placed close together, the possibility arises for malfunctions in the motor. A primary example of this problem is when the electrical brushes within the motor are placed relatively close to the bearing, which is used to facilitate the rotary motion within the motor. Over time, wear on the brushes, the collection of dust, or any variations in the commutator, can result in a short between the electrical brushes and the bearing, which is grounded. This presents a condition where the electric motor does not function as intended or, in some cases the motor ceases to function entirely.

This invention addresses the situation where a shorting of the motor may occur. This invention allows for compact motor design while preventing the undesirable effects that may result from the electrical brushes being in close proximity to the bearing.

SUMMARY OF THE INVENTION

In general terms, this invention is an electric motor assembly that includes an electrical insulation barrier positioned between the electrical brushes and the bearing. The invention allows for compact motor design while avoiding any of the difficulties and drawbacks associated with previous motor designs. Additionally, this invention provides significant advantages and efficiencies when making an electric motor.

An electric motor assembly designed according to this invention includes several basic components. A housing has at least one end wall. A commutator is supported for rotation within the housing. A bearing is supported by the end wall of the housing so that the bearing facilitates rotary motion of the commutator. At least one brush is supported within the housing and positioned relative to the commutator so that electrical current can be supplied to the commutator through the brush. A nonconductive barrier is positioned between the brush and the bearing. The nonconductive barrier prevents any shorting between the bearing and the brush.

A method of making an electric motor assembly according to this invention includes several basic steps. First, the bearing is positioned within a mold. Second, the nonconductive barrier member is positioned adjacent the bearing within the mold. Next, the mold is filled with a nonconductive, moldable material such that at least some of the material surrounds a portion of the bearing and the nonconductive barrier and maintains the barrier member adjacent the bearing. Lastly, the molded material is removed from the mold and the bearing and barrier member are also removed because they are now supported in the molded material.

The various features and advantages of this invention will become apparent to those skilled in the art from the following detailed description of the preferred embodiments. The drawings that accompany the detailed description can be briefly described as follows.

BRIEF DESCRIPTION OF THE DRAWINGS

FIG. 4 is an illustration of the preferred embodiment of an electrical insulation bearing designed according to this invention.

FIG. 5 illustrates the embodiment of FIG. 4 after a portion has been removed.

FIG. 6 illustrates the portion of the embodiment of FIG. 4 that has been removed from the embodiment of FIG. 5.

FIG. 7 schematically illustrates a preferred assembly process designed according to this invention.

DETAILED DESCRIPTION OF THE PREFERRED EMBODIMENT

Figure 1:
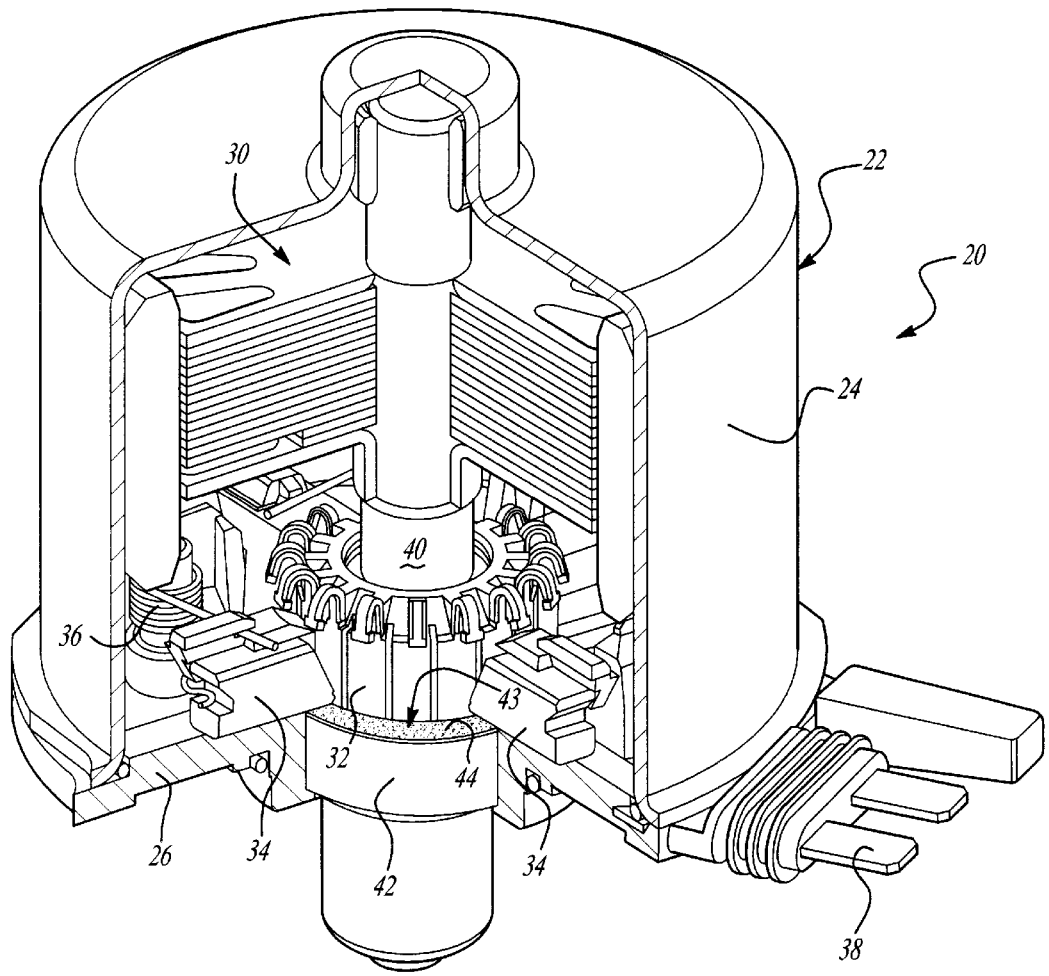
FIG. 1 is a perspective, diagrammatic illustration of a motor assembly designed according to this invention.

FIG. 1 diagrammatically illustrates an electric motor assembly 20. A housing 22 is shown with two components, a cap portion 24 and an end wall portion 26. The cap portion and the end wall portion 26 are secured together in a conventional manner. The housing 22 houses the functional components of the electric motor assembly 20.

A conventional stator and pole arrangement 30 is supported within the housing in a conventional manner. A commutator 32 is supported for rotary movement within the housing 22 in a conventional manner. A plurality of electric brushes 34 are supported by the end wall 26 through support members 36. A terminal 38 is used to connect the electric motor assembly 20 to a conventional power supply so that the motor can be operated as desired. As understood by those skilled in the art, electric current is supplied through the electric brushes 34 to the commutator 32, which induces the desired operation of the electric motor because the commutator 32 rotates within the housing 22.

A bearing 42 facilitates the rotary motion of the shaft 40 relative to the housing 22. Rotation of the shaft 40 is desired so that the rotary movement can be transferred to a device that is coupled to the electric motor to be driven by the motor.

Figure 2:
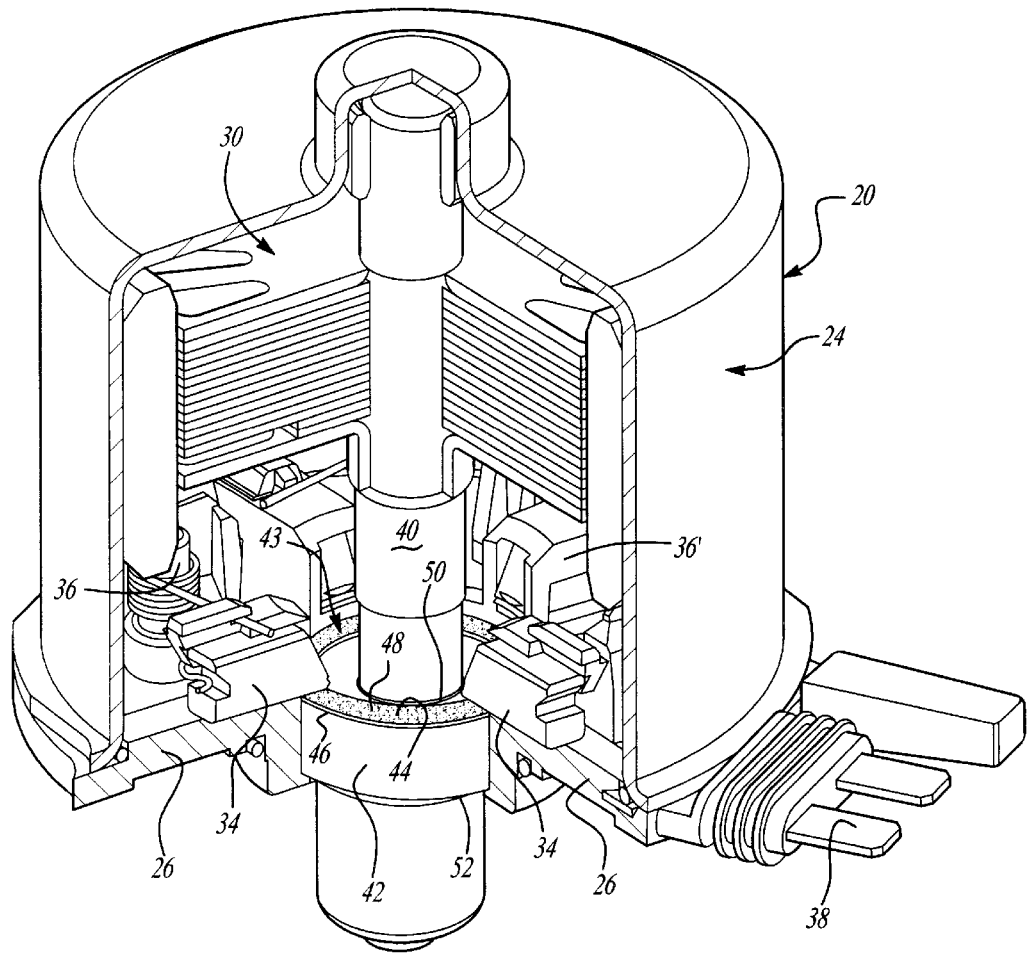
FIG. 2 is an illustration of the embodiment of FIG. 1 with selected components removed.
Figure 3:
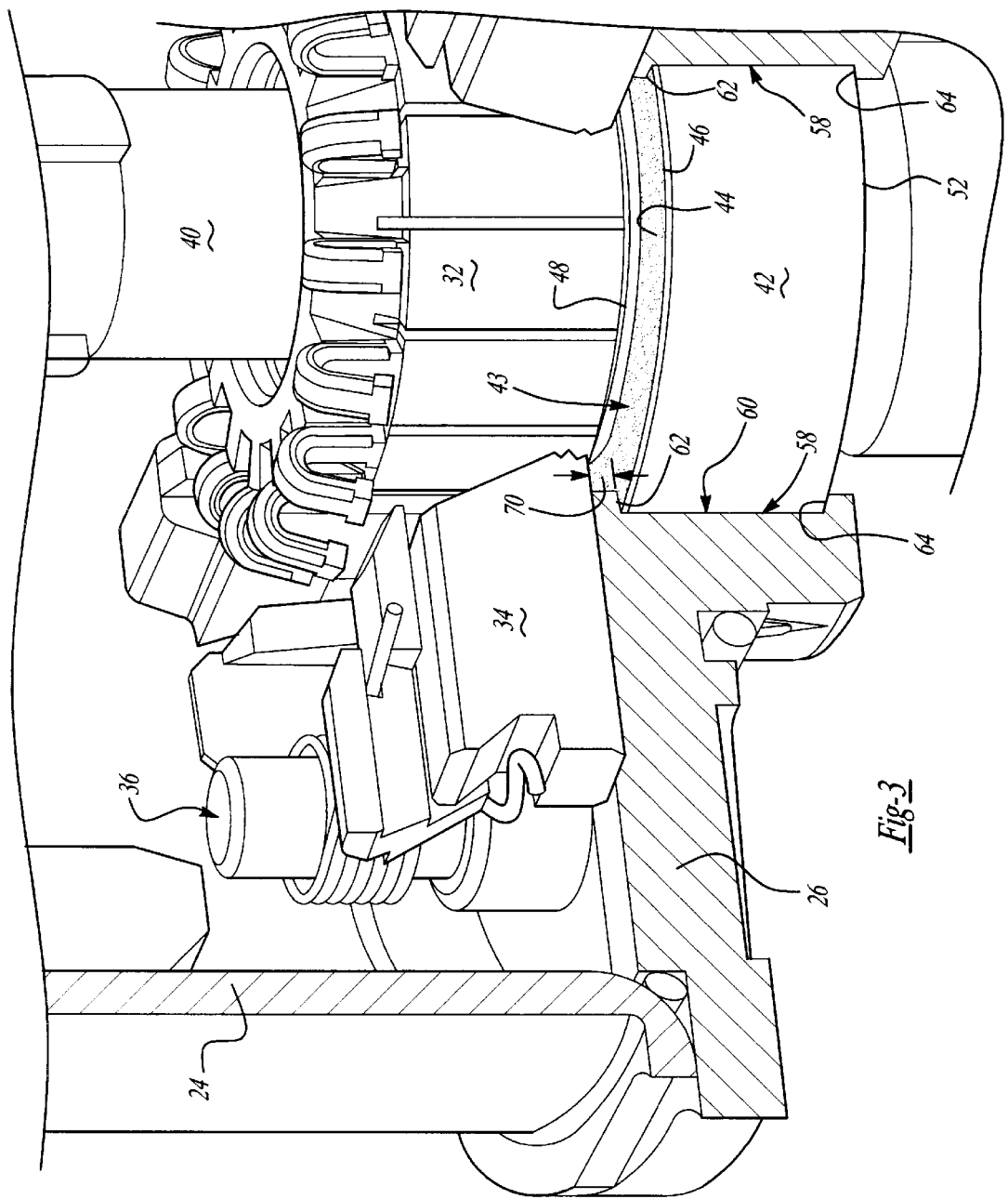
FIG. 3 is a close-up view of a selected portion of the embodiment of FIG. 1.

An electrical insulation barrier 43 is positioned between the bearing 42 and the electrical brushes 34. The bearing 42 preferably is grounded. The electrical brushes 34 provide current to the commutator 32. Therefore, it is important to ensure that the electrical brushes 34 are not grounded or otherwise shorted by any contact or electrical communication with the grounded bearing 42. The electrical insulation barrier 43 ensures that the close proximity between the brushes 34 and the bearing 42 does not result in any compromise of the intended function of the electric motor. As best seen in FIGS. 2 and 3, the electrical insulation barrier 43 preferably comprises a wafer or disk 44 having an outer edge 46 defining an outer diameter. An inner edge 48 defines an inner diameter of the disk 44. The disk 44 preferably is made from a high-temperature dielectric material. An example material is available from DuPont and is known as Nomax Aramid Paper. This is one example of a plastic, dielectric paper that is suitable for making a wafer or disk 44 for use as an electrical insulation barrier designed according to this invention. The Nomax Aramid Paper is preferred because it will tolerate extreme temperatures, which is necessary for the preferred method of making a motor assembly as will be described below.

As can be seen in FIG. 2, the inner diameter 48 of the disk 44 is greater than the inner diameter 50 on the bearing 42. There preferably is spacing between the inner edge or inner diameter 48 of the barrier member 44 and the shaft 40 so that there is no possibility for any portion of the wafer or disk 44 to interfere with the relative movement between the shaft 40 and the bearing 42. If the barrier member 44 is too close to the shaft 40, any damage to the barrier member 44 could cause noise or interference or even cause motor failure in some cases. The generally annular disk 44 preferably has a radial width (defined by the difference between the outer diameter and the inner diameter 48) that is large enough to provide an effective barrier between the brushes 34 and the bearing 42. As can be appreciated from FIG. 3, the disk 44 preferably extends radially inward and beneath the outer edges of the commutator 32.

The bearing 42 preferably has an outer edge 52 that defines an outer diameter of the bearing. The outer diameter of the bearing 42 preferably is equal to the outer diameter of the generally annular disk 44. In other words, the outer diameter defined by the edge 46 preferably is equal to the outer diameter defined by the edge 52. Having an equal outer diameter on the disk 44 and the bearing 42 provides significant advantages for making a motor assembly designed according to this invention.

As best seen in FIG. 3, the end wall 26 includes a opening 58 through a central portion of the end wall 26. The opening 58 preferably is generally annular and corresponds to the size and shape of the bearing 42 and the disk 44. The opening 58 preferably includes an axially extending side wall 60. At the opposite axial ends of the side wall 60, two opposing surfaces 62 and 64 preferably project generally radially inward toward the center axis of the motor assembly. The bearing 42 and the disk 44 are held in place immediately adjacent each other by the opposing surfaces 62 and 64. The bearing 42 and the wafer 44 are preferably snugly maintained and supported within the opening 58 on the end wall 26.

As also seen in FIG. 3, a gap 70 between the brushes 34 and the bearing 42 is relatively small, especially when compared to conventional motor designs. With the non-conductive barrier 43 in place, no possibility exists for any electrical communication between the brushes 34 and the bearing 42, which would otherwise compromise or completely interfere with the operation of the motor. This invention provides a significant advantage because it allows the overall motor design to be more compact and there is no potential adverse effect that would result from the close proximity between the brushes 34 and the bearing 42.

Referring to FIG. 4, a preferred embodiment of the nonconductive barrier 43 is illustrated in greater detail. A generally annular disk member 44 comprises an outer portion of the barrier 43. An inner portion 80 includes a generally annular ring portion and two arm portions 82 and 84 extending between the inner portion 80 and the outer portion 44. The arms 82 and 84 preferably are perforated as illustrated at 86 to facilitate separating the inner portion 80 from the outer portion 44. In embodiments where a dielectric plastic paper is utilized to make the non-conductive barrier 43, conventional perforations 86 have proven useful. In other embodiments where other plastic materials may be used, the illustrated perforations 86 may be a reduced thickness neck portion that is easily frangible so the inner portion can be separated from the outer portion with relative ease.

FIG. 5 illustrates the outer portion 44 after the inner portion 80, which is illustrated in FIG. 6, has been removed.

Although FIG. 4 shows an embodiment of the barrier 43 that includes an inner portion 80, in another embodiment, the barrier 43 is manufactured as illustrated in FIG. 5. In other words, one alternative embodiment to that shown in FIG. 4 includes a single, generally annular ring 44 as illustrated in FIG. 5. This latter example embodiment is preferred in situations where the barrier 43 is press fit onto one side of the bearing 42 during assembly of the motor.

The embodiment of FIG. 4 is especially useful for the preferred method of making a motor assembly according to this invention. FIG. 7 schematically illustrates a preferred method of assembling a motor assembly. A mandrel 90 has an outer dimension that is consistent with the inner diameter 50 of the bearing 42. The bearing 42 preferably is positioned on the mandrel 90. The inner diameter 88 of the inner portion 80 on the electrical barrier member 43 preferably has the same dimension as the inner diameter 50 on the bearing 42. The non-conductive barrier member 43 preferably is received over the mandrel 90 and placed immediately adjacent one edge of the bearing 42. The mandrel 90 maintains the barrier member 43 and the bearing 42 in a centered, radial alignment.

A mold 92 is schematically illustrated in phantom in FIG. 7. The mold 92 preferably has an inner contour (not illustrated) that corresponds to the desired shape of the end wall 26. A non-conductive, moldable material preferably is injected into the mold 92 through an inlet 94 as will be understood by those skilled in the art. In the preferred embodiment, the moldable material is plastic and the plastic is in a liquid form while it is injected through the opening 94. The contour of the mold 92 ensures that the melted plastic material envelopes at least a portion of the bearing 42 and the barrier member 43 so that an arrangement as illustrated in FIG. 3 results.

Since melted plastic materials are preferred for the molding process, it is highly preferred that the non-conductive barrier member 43 be made from a high temperature dielectric material. In one embodiment temperatures in the range of 650° F. are experienced within the mold 92. Therefore, the choice of material for the barrier member 43 preferably is of such character and quality that it withstands high temperatures during the molding process.

After the molded plastic has cured, the mold 92 is opened and the assembled end wall 26, bearing 42 and barrier 43 are removed from the mold and off of the mandrel 90. At this stage of the manufacturing process, the inner portion 80 of the barrier member 43 preferably is separated from the outer portion 44 and the resulting sub-assembly is an end wall 26 supporting a bearing 42 and a barrier member 43, which are ready to be utilized in a completed motor assembly.

A process designed according to this invention introduces manufacturing efficiencies because the barrier 43 is effectively molded in place with the bearing 42 and the end cap 26 during a single process. The method of this invention not only introduces manufacturing economies but also provides a secure arrangement where the barrier member 43 is maintained in the desired position relative to the bearing 42 within the overall motor assembly.

The description just given provides details regarding the currently preferred embodiments of this invention. Variations and modifications to the described embodiments may become apparent to those skilled in the art, which do not necessarily depart from the purview and spirit of this invention. The scope of legal protection given to this invention is limited only by the following claims.

We claim:

1. An electric motor assembly, comprising:
   a housing having at least one end wall;
   a commutator supported for rotation within said housing;

a bearing supported by said end wall, said bearing facilitating rotary motion of said commutator;

at least one brush supported within said housing and positioned relative to said commutator such that electrical current can be supplied to said commutator through said brush;

a nonconductive barrier positioned between said brush and said bearing; and wherein said housing end wall comprises plastic and is molded around said bearing and wherein a portion of said end wall maintains said nonconductive barrier against said bearing.

2. The assembly of claim 1, wherein said barrier comprises a relatively thin piece of nonconductive material.

3. The assembly of claim 2, wherein said nonconductive material is a high temperature dielectric material.

4. The assembly of claim 1, wherein said nonconductive barrier comprises a relatively thin wafer of a dielectric material.

5. The assembly of claim 4, wherein said bearing has an inner and an outer diameter and wherein said wafer is generally annular and has an inner and an outer diameter and wherein said wafer inner diameter is greater than said bearing inner diameter.

6. The assembly of claim 5, wherein said end wall includes a generally annular opening having a diameter that is less than said bearing outer diameter and wherein said wafer outer diameter is approximately equal to said bearing outer diameter, said end wall opening having at least one edge surface that bears against a portion of said wafer and maintains said wafer against said bearing.

7. The assembly of claim 1, wherein said bearing is positioned near one axial end of said commutator and wherein said brush is positioned near said one axial end of said commutator at a preset radial position and wherein said nonconductive barrier has a radial dimension that is sufficient to provide a barrier between said brush and said bearing.

8. The assembly of claim 1, wherein said nonconductive barrier comprises a generally annular wafer made from a dielectric material.

9. The assembly of claim 8, wherein said barrier includes concentric rings made from said material and wherein an inner one of said rings is connected to an outer one of said rings by at least two arm portions and wherein said arm portions include a frangible portion that permits selective separation of said inner and outer rings.

10. The assembly of claim 9, wherein said frangible portions comprise perforations formed in said arm portions.

11. The assembly of claim 1, wherein said end wall includes at least one brush supporting portion that supports said brush and a central opening having opposed surfaces that are positioned near a portion of opposite radial sides of said bearing so that said bearing is axially fixed between said surfaces and wherein said nonconductive barrier is positioned between one of said surfaces and said bearing such that said surface maintains said barrier adjacent said bearing.

12. The assembly of claim 1, wherein said end wall is molded around said bearing and said barrier such that at least a portion of each of said bearing and said barrier are maintained in a preselected position relative to said assembly by said endwall.

13. An electric motor assembly, comprising:

a housing having at least one end wall;

a commutator supported for rotation within said housing;

a bearing supported by said end wall, said bearing facilitating rotary motion of said commutator;

at least one brush supported within said housing and positioned relative to said commutator such that electrical current can be supplied to said commutator through said brush;

a nonconductive barrier positioned between said brush and said bearing, wherein said nonconductive barrier is a generally annular wafer made from a dielectric material that includes concentric rings made from said material and wherein an inner one of said rings is connected to an outer one of said rings by at least two arm portions and wherein said arm portions include a frangible portion that permits selective separation of said inner and outer rings.

14. An electric motor assembly, comprising:

a housing having at least one end wall;

a commutator supported for rotation within said housing;

a bearing supported by said end wall, said bearing facilitating rotary motion of said commutator;

at least one brush supported within said housing and positioned relative to said commutator such that electrical current can be supplied to said commutator through said brush;

a nonconductive barrier positioned between said brush and said bearing; and wherein said end wall includes at least one brush supporting portion that supports said brush and a central opening having opposed surfaces that are positioned near a portion of opposite radial sides of said bearing so that said bearing is axially fixed between said surfaces and wherein said nonconductive barrier is positioned between one of said surfaces and said bearing such that said surface maintains said barrier adjacent said bearing.

15. An electric motor assembly, comprising:

a housing having at least one end wall;

a commutator supported for rotation within said housing;

a bearing supported by said end wall, said bearing facilitating rotary motion of said commutator;

at least one brush supported within said housing and positioned relative to said commutator such that electrical current can be supplied to said commutator through said brush;

a nonconductive barrier positioned between said brush and said bearing; and wherein said end wall is molded around said bearing and said barrier such that at least a portion of each of said bearing and said barrier are maintained in a preselected position relative to said assembly by said endwall.

* * * * *